United States Patent
Van Den Berg et al.

(10) Patent No.: US 8,679,450 B2
(45) Date of Patent: Mar. 25, 2014

(54) PROCESS TO PREPARE A HYDROGEN RICH GAS MIXTURE

(75) Inventors: Robert Van Den Berg, Amsterdam (NL); Mark Jan Prins, Amsterdam (NL); Matthieu Simon Henrl Fleys, Amsterdam (NL)

(73) Assignee: Shell Oil Company, Houston, TX (US)

( * ) Notice: Subject to any disclaimer, the term of this patent is extended or adjusted under 35 U.S.C. 154(b) by 273 days.

(21) Appl. No.: 13/256,641

(22) PCT Filed: Mar. 18, 2010

(86) PCT No.: PCT/EP2010/053560
§ 371 (c)(1),
(2), (4) Date: Sep. 15, 2011

(87) PCT Pub. No.: WO2010/106148
PCT Pub. Date: Sep. 23, 2010

(65) Prior Publication Data
US 2012/0001126 A1    Jan. 5, 2012

(30) Foreign Application Priority Data
Mar. 19, 2009  (EP) .................... 09155616

(51) Int. Cl.
*C01B 3/12*   (2006.01)
*C01B 3/16*   (2006.01)
*C01B 3/02*   (2006.01)

(52) U.S. Cl.
USPC ........... 423/655; 48/197 R; 252/373; 423/656

(58) Field of Classification Search
USPC .................. 423/655, 656; 252/373; 48/197 R
See application file for complete search history.

(56) References Cited

U.S. PATENT DOCUMENTS

| | | | | |
|---|---|---|---|---|
| 4,021,366 A | * | 5/1977 | Robin et al. | 252/373 |
| 4,177,252 A | * | 12/1979 | Chinchen | 423/656 |
| 4,704,137 A | * | 11/1987 | Richter | 48/197 R |
| 4,981,661 A | * | 1/1991 | Borsboom et al. | 423/244.1 |
| 6,476,084 B2 | * | 11/2002 | Whitney | 518/700 |
| 7,501,112 B2 | * | 3/2009 | Watson | 423/648.1 |
| 2005/0271580 A1 | * | 12/2005 | Kelly | 423/656 |

FOREIGN PATENT DOCUMENTS

| | | | | |
|---|---|---|---|---|
| EP | 551951 | 1/1993 | ............ | B01D 46/24 |
| EP | 0934904 | 8/1999 | ................ | C01B 3/48 |
| EP | 1195353 | 4/2002 | ................ | C01B 3/50 |
| EP | 1939138 | 7/2008 | ................ | C01B 3/52 |
| WO | WO 03080221 | 10/2003 | ............. | B01D 46/24 |

* cited by examiner

*Primary Examiner* — Wayne Langel

(57) ABSTRACT

Process to prepare a hydrogen rich gas mixture from a halogen containing gas mixture comprising hydrogen and at least 50 vol. % carbon monoxide, on a dry basis, by contacting the halogen containing gas mixture with water having a temperature of between 150 and 250° C. to obtain a gas mixture poor in halogen and having a steam to carbon monoxide molar ratio of between 0.2:1 and 0.9:1 and subjecting said gas mixture poor in halogen to a water gas shift reaction wherein part or all of the carbon monoxide is converted with the steam to hydrogen and carbon dioxide in the presence of a catalyst as present in one fixed bed reactor or in a series of more than one fixed bed reactors and wherein the temperature of the gas mixture as it enters the reactor or reactors is between 190 and 230° C.

7 Claims, No Drawings

PROCESS TO PREPARE A HYDROGEN RICH GAS MIXTURE

PRIORITY CLAIM

The present application claims priority from PCT/EP2010/053560, filed 18 Mar. 2010, which claims priority from European Application 09155616.7, filed 19 Mar. 2009.

BACKGROUND

The invention is directed to a process to prepare a hydrogen rich gas mixture from a halogen containing gas mixture comprising hydrogen and at least 50 vol. % carbon monoxide, on a dry basis.

EP-A-1939138 describes a process wherein a hydrogen and halogen containing gas rich in CO is subjected to a water gas shift reaction. In this process the gas is first subjected to a water scrubbing step to remove the halogen compounds from the gas. Subsequently part of the scrubbed gas is contacted with liquid water having a temperature of below the saturation temperature of water. After adding additional steam the gas is used as feed to the water gas shift reaction. The molar ratio of steam to carbon monoxide in said feed is preferably about 2.8:1 according to this publication.

A disadvantage of this process is that a complex process line-up is required to increase the steam content in the gas as fed to the water gas shift reaction step. There is a desire for a more efficient process. The following process provides such a more efficient process.

SUMMARY OF THE INVENTION

Process to prepare a hydrogen rich gas mixture from a halogen containing gas mixture comprising hydrogen and at least 50 vol. % carbon monoxide, on a dry basis, by contacting the halogen containing gas mixture with water having a temperature of between 150 and 250° C. to obtain a gas mixture poor in halogen and having a steam to carbon monoxide molar ratio of between 0.2:1 and 0.9:1 and subjecting said gas mixture poor in halogen to a water gas shift reaction wherein part or all of the carbon monoxide is converted with the steam to hydrogen and carbon dioxide in the presence of a catalyst as present in one fixed bed reactor or in a series of more than one fixed bed reactors and wherein the temperature of the gas mixture as it enters the reactor or reactors is between 190 and 230° C.

DETAILED DESCRIPTION

It has been found that with the above process hydrogen can be prepared from a halogen containing gas comprising a high content of carbon monoxide wherein less added steam is required and wherein the process line-up is simplified as compared to the prior art process.

The halogen containing gas mixture comprising hydrogen and at least 50 vol. % carbon monoxide, on a dry basis, is preferably obtained by gasification of a halogen containing carbonaceous feedstock. Preferably the feedstock also comprises a certain amount of ash. More preferably the gasification is performed in a so-called entrained flow gasifier. The gasification of the halogen containing carbonaceous feedstock suitably takes place at a temperature of between 1200 and 1800° C., preferably between 1400 and 1800° C., and at a pressure of between 2 and 10 MPa. The solid carbonaceous feed is partially oxidised with an oxygen comprising gas. Preferred carbonaceous feeds are solid, high carbon containing feedstocks, more preferably it is substantially (i.e. >90 wt. %) comprised of naturally occurring coal or synthetic (petroleum) cokes, most preferably coal. Suitable coals include lignite, bituminous coal, sub-bituminous coal, anthracite coal and brown coal. Another suitable feedstock is biomass. The preferred ash content in the feedstock is suitably between 2 and 40 wt %. The solid feedstock is suitably supplied to a partial oxidation burner in the form of a powder and a carrier gas. Suitable carrier gasses are for example nitrogen, carbon dioxide or recycle synthesis gas.

Typical halogen compounds as present in the halogen containing gas mixture are chloride compounds, like for example HCl, and optionally fluoride compounds, like for example HF. The invention is especially suited for halogen containing gas, as it is fed to step (a), having a content of halogen compounds of between 50 and 1000 ppm.

The gasses obtained at the above-elevated temperatures are preferably cooled by quenching with a cold gas and/or with an evaporating liquid, for example water. The cooling step preferably involves indirect cooling in a heat exchanger. The hot gasses are preferably cooled to a temperature below 900° C., more preferably between 150 and 350° C. to obtain the halogen containing gas mixture comprising hydrogen and at least 50 vol. % carbon monoxide as used in the process according to the present invention. If ash compounds are present in the halogen containing gas it is preferred to remove these particles, sometimes referred to as fly-ash, from the gas before performing the water gas shift reaction. Preferably the halogen containing gas is not saturated with water. Ash is preferably separated from such a non-water saturated gas by means of a cyclone or by means of a ceramic filter or a metal filter as for example described in EP-A-551951 and EP-A-1499418.

Contacting the halogen containing gas mixture with water is preferably performed in a counter-current contactor, wherein water having a temperature of between 150 and 250° C. is continuously fed to the top of the contactor and the halogen containing gas to the bottom end. In such a contactor the gas mixture poor in halogen and having a steam to carbon monoxide molar ratio of between 0.2:1 and 0.9:1 is continuously obtained at the top of the contactor and a halogen laden water stream is obtained at the bottom. Part of this water may be recycled to the top and part is preferably treated. Some water will evaporate and will end up in the gas mixture poor in halogen as steam. The gas will typically be saturated with steam at the conditions of the gas as it exits the top of the contactor. It is within the capabilities of the skilled person to choose the temperature of the halogen containing gas mixture, the temperature of the water as fed to the top of the contactor from the above ranges and the throughput to achieve a steam to carbon monoxide molar ratio of between 0.2:1 and 0.9:1 in the gas mixture poor in halogen.

An advantage of the present process is that the steam content of the gas mixture poor in halogen as it leaves the contactor is in the correct range to perform the water gas shift reaction. The invention is thus also directed to a process wherein no water or steam is added to the gas mixture poor in halogen before performing the water gas shift reaction in the reactor or, in case of more than one reactor, in the first reactor of such a series of reactors. More preferably the gas mixture poor in halogen as obtained after contacting with water is directly used as feed to the water gas shift reaction. In case a series of water gas shift reactions take place the gas mixture poor in halogen is directly used as feed to the first water gas shift reaction in such a preferred embodiment.

In the next step the gas mixture poor in halogen is subjected to a water gas shift reaction wherein part or all of the carbon monoxide is converted with the steam to hydrogen and carbon dioxide in the presence of a catalyst according to the following reaction:

$$CO + H_2O \rightarrow CO_2 + H_2$$

The water gas shift is performed by the following process wherein carbon monoxide as present in a gas mixture is converted with a low amount of steam to a mixture of hydrogen and carbon dioxide by means of a catalyzed water gas shift reaction as performed in the presence of a catalyst as present in one or more fixed bed reactors. A series of water gas shift reactors may be used wherein in each reactor a water gas shift conversion step is performed. The content of carbon monoxide, on a dry basis, in the syngas mixture as supplied to the first water gas shift conversion step or reactor is preferably at least 50 vol. %, more preferably between 50 and 75 vol. %. The syngas preferably contains hydrogen sulphide in order to keep the catalyst sulphided and active. The minimum content of hydrogen sulphide will depend on the operating temperature of the reactor, on the space velocity (GHSV) and on the sulphur species present in the syngas mixture. Preferably at least 300 ppm $H_2S$ is present in the syngas mixture. There is no limitation on the maximum amount of $H_2S$ from a catalyst activity point of view.

The steam to carbon monoxide molar ratio in the syngas as it enters the first reactor is between 0.2:1 and 0.9:1. The temperature of the syngas as it enters the reactor is preferably between 190 and 230° C. In addition it is preferred that the inlet temperature is between 10 and 60° C. above the dewpoint of the feed to each water gas shift conversion step. The space velocity in the reactor is preferably between 6000-9000 $h^{-1}$. The pressure will depend on the pressure at which the above described gasification is performed and is preferably between 2 and 5 MPa and more preferably between 3 and 4.5 MPa.

The conversion of carbon monoxide will not be 100% because of the sub-stoichiometric amount of steam present in the feed of the reactor. In a preferred embodiment the content of carbon monoxide in the reactor effluent of a first fixed bed reactor, on a dry basis, will be between 35 and 50 vol. % when starting from a syngas mixture comprising between 55 and 70 vol. % carbon monoxide, on a dry basis, and a steam/CO ratio of 0.2 to 0.3 molar. If a further conversion of carbon monoxide is desired it is preferred to subject the effluent to a next water gas shift conversion step as performed in a next fixed bed reactor. The steam to carbon monoxide molar ratio, inlet temperature and space velocity for such subsequent water gas shift conversion steps may be as described for the first water gas shift conversion step or different.

In order to achieve the desired steam to CO molar ranges for the subsequent steps, after performing a first water gas shift reaction in a first reactor, steam or boiler feed water may be added to the effluent of each previous step. Preferably boiler feed water is added to the relatively hot effluent of the previous reactor in order to reduce the temperature to the desired ranges and at the same time generate steam.

The water gas shift step may be repeated to stepwise lower the carbon monoxide content in the effluent of each next water gas shift reactor to a CO content, on a dry basis, of below 5 vol. %. It has been found that in 4 to 5 steps, or said otherwise, in 4 to 5 reactors such a CO conversion can be achieved.

It has been found that it is important to control the temperature rise in each reactor. It is preferred to operate each reactor such that the maximum temperature in the catalyst bed in a single reactor does not exceed 440° C. and more preferably does not exceed 400° C. At higher temperatures the exothermal methanation reaction $$CO + 3H_2 \leftrightarrow CH_4 + H_2O$$

can take place, resulting in an uncontrolled temperature rise.

In conventional prior art shift reactors a large excess of steam is added for temperature control (to limit the adiabatic temperature rise) and to suppress methanation. In the present invention, such excess of steam is avoided, as steam is used as the limiting reactant, which results in an overall more utility-efficient water gas shift process than prior art water gas shift processes.

The catalyst is preferably a water gas shift catalyst, which is active at the preferred low steam to CO molar ratio and active at the relatively low inlet temperature without favouring side reactions such as methanation. Suitably the catalyst comprises a carrier and the oxides or sulphides of molybdenum (Mo), more preferably a mixture of the oxides or sulphides of molybdenum (Mo) and cobalt (Co) and even more preferably also comprising copper (Cu) tungsten (W) and/or nickel (Ni). The catalyst suitably also comprises one or more promoters/inhibitors such as potassium (K), lanthanum (La), manganese (Mn), cerium (Ce) and/or zirconium (Zr). The carrier may be a refractory material such as for example alumina, $MgAl_2O_4$ or $MgO—Al_2O_3—TiO_2$.

The reacted gas exiting the water gas shift reactor is very dry, which favors the production of methane in the methanation reaction described above. The promoters/inhibitors described above help to avoid this highly exothermic unwanted side reaction, which can also result in a temperature runaway.

An example of a suitable catalyst comprises an active γ-$Al_2O_3$ carrier and between 1-8 wt % CoO and between 6-10 wt % $MoO_3$. The catalyst is preferably present as an extrudate.

Sulphur compounds and carbon dioxide as present in the hydrogen rich gas mixture as obtained by the process according to the invention may be separated by known gas treating processes. The hydrogen may be used in chemical applications or in process to make power, for example as feedstock to a gas turbine.

The preferred water gas shift process as described above shall be illustrated by the following example.

EXAMPLE

The following example shows the results a process simulation using the PRO/II® program as obtained from Invensys Systems, Inc./SimSci-Esscor, 26561 Rancho Parkway South, Lake Forest, Calif. 92630, USA.

A water scrubbed syngas mixture of carbon monoxide and hydrogen as obtained in a coal gasification process and having the composition and temperature as described in Table 1 is fed to a first water gas shift reactor at a space velocity of 8000 $h^{-1}$.

TABLE 1

| | |
|---|---|
| Temperature | 177 |
| $H_2$ (vol. %) (*) | 22.6 |
| CO (vol %) | 68.7 |
| $CO_2$ (vol %) | 6.8 |
| $N_2$ (vol %) | 1.5 |
| $H_2O$/CO molar ratio | 0.32 |
| Sulphur (ppm) | 2150 |

(*) content on a dry basis

To the effluent of the first water gas shift reactor an amount of steam was added to achieve a $H_2O$/CO molar ratio as in Table 2. The resulting mixture was fed to a second water gas shift reactor at the temperature conditions listed in Table 2. The effluent of the second reactor is in turn provided to a third water gas shift reactor after adding some steam. The effluent of the third reactor is in turn provided to a fourth water gas shift reactor after adding some steam and the effluent of the fourth reactor is in turn provided to a fifth water gas shift reactor after adding some steam. The conditions and compositions of the streams are listed in Table 2.

The results in Table 2 show that more than 90% conversion of CO is achieved using a relatively low amount of added steam, corresponding to an overall Steam/CO ratio of about 1.

TABLE 2

| Reactor | Inlet temp. (° C.) | Outlet temp. (° C.) | Inlet CO content (vol. %) dry | Outlet CO content (vol. %) dry | $H_2O$/CO molar ratio at reactor inlet | Space velocity ($h^{-1}$) |
|---|---|---|---|---|---|---|
| 1 | 210 | 401 | 68.6 | 40 | 0.32 | 8000 |
| 2 | 210 | 301 | 40 | 29 | 0.25 | 8000 |
| 3 | 210 | 342 | 29 | 12 | 0.8 | 8000 |
| 4 | 210 | 263 | 12 | 6 | 0.9 | 8000 |
| 5 | 190 | 212 | 6 | 4 | 0.9 | 8000 |

What is claimed is:

1. A process to prepare a hydrogen rich gas mixture from a halogen containing gas mixture comprising hydrogen and at least 50 vol. % carbon monoxide, on a dry basis, by contacting the halogen containing gas mixture with water having a temperature of between 150 and 250° C. to obtain a gas mixture poor in halogen and having a steam to carbon monoxide molar ratio of between 0.2:1 and 0.9:1 and subjecting said gas mixture poor in halogen to a water gas shift reaction wherein part or all of the carbon monoxide is converted with the steam to hydrogen and carbon dioxide in the presence of a catalyst as present in one fixed bed reactor or in a series of more than one fixed bed reactors and wherein the temperature of the gas mixture as it enters the reactor or reactors is between 190 and 230° C.

2. A process according to claim 1, wherein the carbon monoxide, on a dry basis, in the halogen containing gas mixture is between 50 and 75 vol. %.

3. A process according to claim 1, wherein the space velocity in the fixed bed reactor or in any one fixed bed reactor of a series of reactors is between 6000-9000 $h^{-1}$.

4. A process according to claim 1, wherein the water gas shift reaction is performed in a series of 4 or 5 reactors.

5. A process according to claim 1, wherein each reactor is operated such that the maximum temperature in the fixed bed does not exceed 440° C.

6. A process according to claim 1, wherein one fixed bed reactor is use and wherein no water or steam is added to the gas mixture poor in halogen before subjecting said gas mixture to the water gas shift reaction.

7. A process according to claim 1, wherein multiple fixed bed reactors are used and wherein boiler feed water or steam is injected in between reactors.

* * * * *